J. E. B. JARVIS, DEC'D.
L. M. JARVIS, ADMINISTRATRIX.
HORSE LIFT RAKE.
APPLICATION FILED JAN. 16, 1912.
1,044,458.
Patented Nov. 12, 1912.
2 SHEETS—SHEET 1.
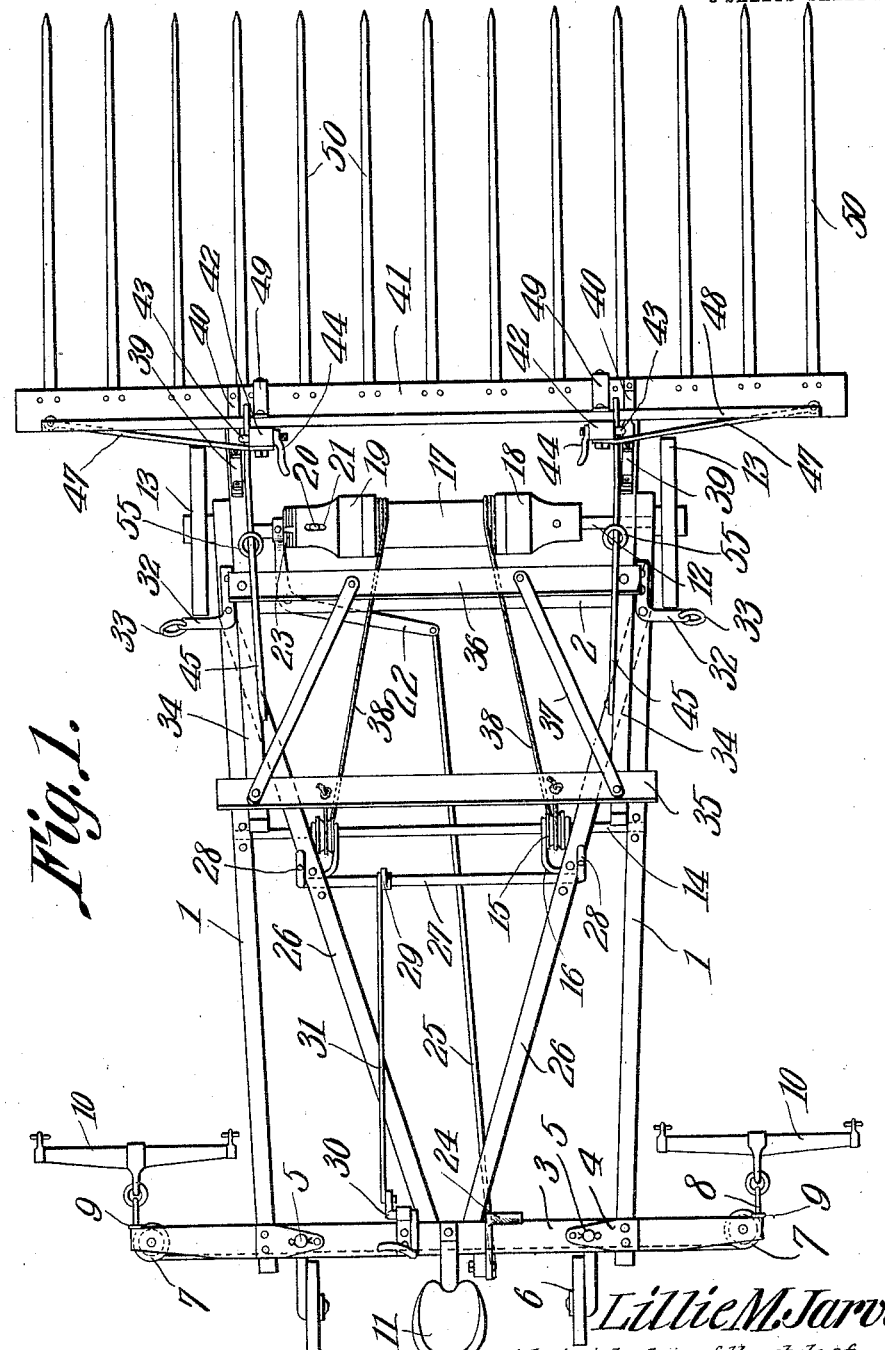

J. E. B. JARVIS, DEC'D.
L. M. JARVIS, ADMINISTRATRIX.
HORSE LIFT RAKE.
APPLICATION FILED JAN. 16, 1912.
1,044,458.
Patented Nov. 12, 1912.
2 SHEETS—SHEET 2.
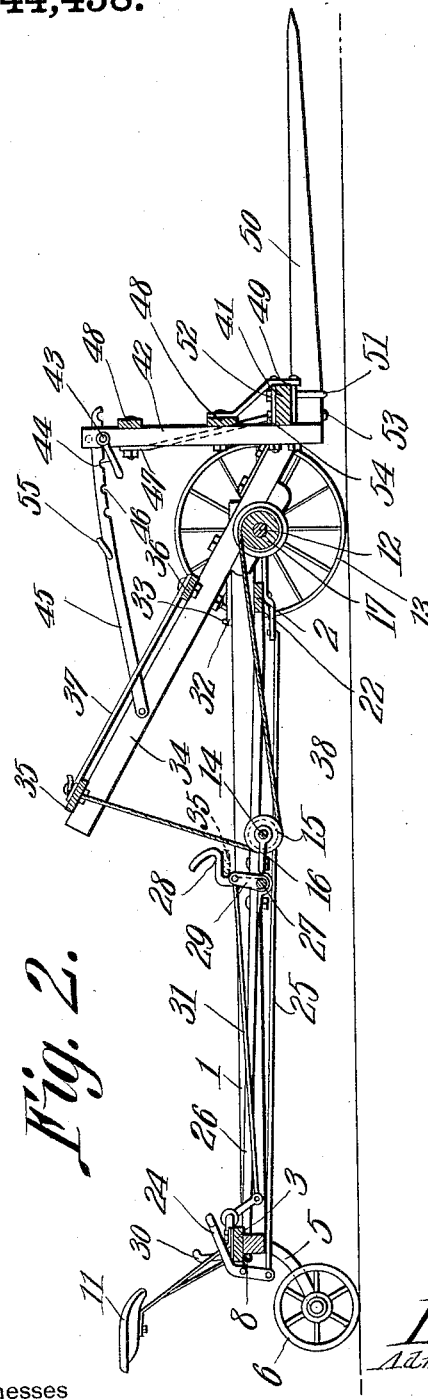
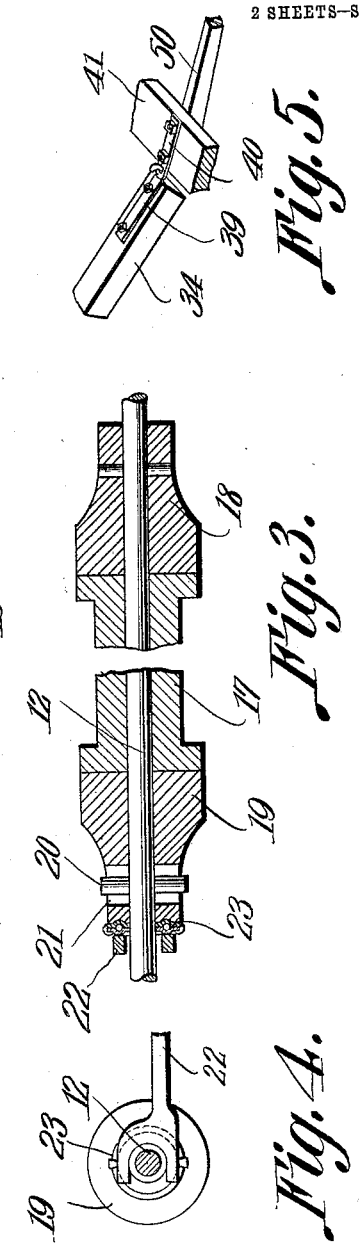
Witnesses
Lillie M. Jarvis
Administratrix of the estate of
John E. B. Jarvis, Inventor,
by C. A. Snow & Co.
Attorneys.

UNITED STATES PATENT OFFICE.

JOHN E. B. JARVIS, DECEASED, BY LILLIE M. JARVIS, ADMINISTRATRIX, OF SEDALIA, MISSOURI.

HORSE LIFT-RAKE.

1,044,458. Specification of Letters Patent. Patented Nov. 12, 1912.

Application filed January 16, 1912. Serial No. 671,477.

*To all whom it may concern:*

Be it known that I, LILLIE M. JARVIS, a citizen of the United States, residing at Sedalia, in the county of Pettis and State of Missouri, am administratrix of the estate of JOHN E. B. JARVIS, deceased, who invented a new and useful Horse Lift-Rake, of which the following is a specification.

This invention relates to a horse lift rake and consists in the novel construction and arrangement of its parts as hereinafter shown and described.

The object of the invention is to provide a wheel mounted hay rake structure adapted to be operated by horses or equivalent draft animals for the purpose of accumulating a load of material and means being provided whereby when the material has been accumulated the parts of the structure which directly support the load may be elevated whereby the rake structure may be conveniently transported from place to place in order that the load may be deposited at a desired point.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing, Figure 1 is a top plan view of the horse lift rake. Fig. 2 is a vertical longitudinal sectional view of the same. Fig. 3 is a longitudinal sectional view through the winding drum mounted upon the axle of the main frame of the rake showing the said winding drum and adjacent parts in section. Fig. 4 is a side elevation of a portion of a clutch operating means used upon the rake. Fig. 5 is a detailed perspective view of means for operatively connecting the rake structure with the rake frame.

The wheel mounted frame which forms a component part of the rake structure includes side bars 1 which are connected together in the vicinity of their forward ends by a cross bar 2 and at their rear ends by a cross bar 3. Plates 4 are mounted upon the cross bar 3 and are provided with bearings which receive the shanks 5 of caster wheels 6. Pulleys 7 are journaled for rotation at the ends of the cross bar 3 and a cable 8 extends along the rear edge of the said cross bar 3 and passes around the outer portions of the pulleys 7 journaled at the opposite ends thereof. The said cable is held in position about the peripheries of the pulleys 7 by means of eyes 9 which are attached to the cross bar 3. Swingle trees 10 are attached to the ends of the cable 8. An operator's seat 11 is mounted upon the cross bar 3. An axle 12 is journaled for rotation at the forward end portions of the side bars 1 and traction wheels 13 are fixed to the ends of the said axle. A cross rod 14 is attached at its ends to the side bars 1 at points approximately midway between the ends of the same and sheave pulleys 15 are loosely journaled upon the said bar 14. Guides 16 are secured at their ends to the cross rod 14 and straddle the rear portions of the sheave pulleys 15.

A winding drum 17 is loosely journaled upon the intermediate portion of the axle 12 and an abutment block 18 is fixed to the shaft 12 at one end of the winding drum 17. A block 19 is slidably mounted upon the shaft 12 to a limited extent and is located at the end of the winding drum 17 opposite the end thereof which is adjacent the end of the block 18. The said block 19 is constrained to rotate in unison with the shaft 12 by means of a pin 20 which passes through an elongated slot 21 provided in the said block 19.

A bell crank lever 22 is fulcrumed upon the under side of the cross bar 2 and at its working end bears against a ball bearing 23 carried at the outer end of the block 19. A lever 24 is fulcrumed upon the cross bar 3 and a rod 25 is pivotally connected at one end with the working end of the lever 24 and pivotally connected at its other end with the power end of the lever 22. The lever 24 is in the form of a treadle lever with its power end within convenient reach of one occupying the seat 11. Braces 26 are attached at their forward ends to the forward end portions of the side bars 1 and at their rear ends to the intermediate portion of the cross bar 3. A shaft 27 is journaled upon the braces 26 and is provided with hooks or crank ends 28. The said shaft 27 is further provided with an upstanding arm 29.

A treadle lever 30 is fulcrumed upon the cross bar 3 and a rod 31 is pivotally connected at one end with the working end of the lever 30 and is pivotally connected at its other end with the arm 29. The power end of the lever 30 is located within convenient reach of one occupying the seat 11. Irons 32 are attached to the forward portions of the side bars 1 and carry rings 33 to which may be attached the breast chains of the draft animals.

The rake frame will now be described: The last said frame includes side bars 34 which are pivotally mounted at points intermediate their ends upon the axle 12. A cross bar 35 connects the rear ends of the bars 34 together and a cross bar 36 connects the bars 34 together at points intermediate their ends. Braces 37 extend rearwardly from the cross bar 36 to the cross bar 35 and are attached to both of the said bars. Cables 38 are arranged to wind upon the drum 17 and pass under the sheave pulleys 15 through the guides 16 and are connected at their upper ends to the end portions of the cross bar 35. Hooks 39 are fixed to the upper sides of the forward portions of the bars 34 and are adapted to engage eyes 40 attached to the upper side of the rake head 41. Posts 42 are supported upon the intermediate portions of the rake head 41 and are provided in the vicinity of their upper ends with draw hooks 43 which in turn are provided with screw threaded clamp nuts 44. Arms 45 are pivotally connected at their rear ends to the rear portions of the bars 34 and are notched out at their under edges as at 46 (best seen in Fig. 2 of the drawings) and the hooked ends of the hook bolts 44 are adapted to enter the notches 46 of the arms 45 and thus means are provided for securing the posts 42 at desired adjusted angles with relation to the bars 34. Braces 47 are connected at their outer end with the outer end portions of the head 41 and at their inner ends with the upper end portions of the posts 42. Back bars 48 of usual pattern are supported upon the posts 42 above the head 41. Braces 49 are secured to the forward edge of the head 41 and at their upper ends are secured to a lowermost back bar 48. Teeth 50 are secured at their rear ends to the head 41. The said teeth may be secured in any desired manner but preferably are attached by means of U-bolts 51 which receive the rear end portions of the teeth 50 and pass up through perforations provided in the head 41 and they are secured at their ends by means of nuts 52. Also bolts 53 pass transversely through the rear ends of the teeth 50 and the rear edge portion of the head 41 and are secured at their upper ends by means of nuts 54. The arms 45 are provided with rings 55 to which may be attached straps from the bits of the draft animal.

From the above description it will be seen that when draft animals are hitched to the swingle trees 10 and connected with the other parts of the rake as above indicated and the rake is pushed over the surface of the ground while the teeth are lowered in contact with the surface of the ground that the hay or other material will be accumulated upon the teeth 50 and when a sufficient load has been collected the operator presses with his foot upon the power end of the treadle 24 whereby the said treadle is swung and the rod 25 is moved longitudinally and the bell crank lever 23 is swung upon its fulcrum. When this is done the working end of the said bell crank lever 22 will force the block 19 longitudinally of the shaft 12 so that the end of the said block will have sufficient frictional contact with the winding drum 17 to cause the said drum to rotate in the direction in which the traction wheels 3 are located. This movement on the part of the winding drum 17 will wind the cables 37 thereon which will draw down the cross bar 35 and the rear ends of the bars 34. When the cross bar 35 encounters the hook extremities 28 of the shaft 27, said shaft is partially rotated so that the said hooks will be forced in a backward direction and the cross bar 35 passes under the said hooks. The said hooks will then immediately move in a forward direction and secure the cross bar 35 from swinging upward. Thus when the load has been elevated together with the teeth 50 and the head 41, the rake may be readily moved from one point to another. When it is desired to relieve the teeth 50 of the accumulated load the operator places one foot upon the working end of the lever 24 and with the other foot moves the lever 30 whereby the rod 31 is moved longitudinally and through the arm 29 the shaft 27 is partially rotated. This movement on the part of the shaft 27 will carry the hook extremity 28 back beyond the rear edge of the cross bar 35 and thus as the operator gradually releases his pressure upon the lever 24 the winding drum 17 may be permitted to rotate in a direction the opposite from that last above described. It is due to the weight of the material upon the teeth 50 that causes the said winding drum 17 to rotate in the reverse direction as indicated. This is for the reason that the bars 47 are connected with the head 41 and posts 42 and consequently as the teeth 50 descend under the weight of the load the rear ends of the arms 34 are swung upwardly and the cross bar 35 moves with the cables 38 which unwind from the drum 17.

If for any reason it should be desired to readily transport the rake from place to place or to pass the same through comparatively narrow passages as for instance gateways or lanes, the hooks 43 may be disengaged from the arms 45 and the forward ends of the teeth 50 may be swung in an upward direction whereby the head 41 and the eyes 40 carried thereby may be lifted off of the hooks 39 supported at the lower forward ends of the bars 34. When this is done the head 41 and the teeth 50 are turned in a sidewise direction and placed directly on top of the wheel mounted frame of which the parts 1, 2 and 3 are components together with their supporting wheels. When this is done the entire structure may be readily transported from place to place.

Having described the invention what I claim as new and desire to secure by Letters Patent is:

1. A rake comprising a frame, an axle journaled at the forward portion of the frame, traction wheels fixed to the axle, a rake frame pivoted upon said axle, a rake head and teeth connected with the rake frame, a winding drum located upon the axle, manually operable means for causing the said winding drum to rotate with the axle, cables arranged to wind upon said drum and connected at their rear ends with the rake frame, sheave pulleys journaled upon the wheel supported frame and around which said cables pass, and a securing means for the rake frame located upon the wheel mounted frame and adapted to hold the rake structure in elevated position.

2. A rake comprising a frame, an axle journaled for rotation at the forward portion of said frame, traction wheels fixed to said axle, a winding drum mounted upon the axle, manually operable means for causing said winding drum to rotate in unison with the axle, a rake frame, pulleys journaled upon the wheel supported frame, cables arranged to wind at one end upon the winding drum and secured at their other ends to the rake frame and passing around said pulleys, said rake frame being pivotally mounted upon the axle, a securing device mounted upon the main frame and adapted to engage the rake frame to hold the same, and a rake structure adjustably connected with the rake frame.

3. A rake comprising a frame, an axle journaled for rotation at the forward portion of the frame, traction wheels fixed to said axle, a winding drum located upon the axle, manually operable means adapted to cause the said winding drum to rotate in unison with the axle, a rake frame pivoted upon the axle, sheave pulleys journaled upon the wheel mounted frame, cables connected to wind upon said winding drum, and connected at their other ends with the said rake frame, sheaves journaled upon the frame and around which said cables pass, securing means mounted on the wheel mounted frame and adapted to engage the rake frame to secure the same, and a rake head and teeth detachably and adjustably connected with the said rake frame.

In testimony that I claim as administratrix of the estate of JOHN E. B. JARVIS the foregoing as my own, I have hereto affixed my signature in the presence of two witnesses.

LILLIE M. JARVIS,
*Administratrix of the estate of John E. B. Jarvis, deceased.*
Witnesses:
W. S. BRUMMETT,
DANIEL BRUMMETT.

---

Copies of this patent may be obtained for five cents each, by addressing the "Commissioner of Patents, Washington, D. C."